US008314704B2

(12) United States Patent
Cova et al.

(10) Patent No.: US 8,314,704 B2
(45) Date of Patent: Nov. 20, 2012

(54) ASSET TRACKING USING ALTERNATIVE SOURCES OF POSITION FIX DATA

(75) Inventors: Nicholas D. Cova, Salt Lake City, UT (US); Nalini Subramaniyam, Union City, CA (US)

(73) Assignees: Deal Magic, Inc., Edmonds, WA (US); Savi Technology, Inc., Alexandria, VA (US)

( * ) Notice: Subject to any disclaimer, the term of this patent is extended or adjusted under 35 U.S.C. 154(b) by 303 days.

(21) Appl. No.: 12/567,241

(22) Filed: Sep. 25, 2009

(65) Prior Publication Data

US 2011/0050424 A1 Mar. 3, 2011

Related U.S. Application Data

(60) Provisional application No. 61/237,964, filed on Aug. 28, 2009.

(51) Int. Cl.
 *G08B 13/14* (2006.01)
(52) U.S. Cl. .............. 340/572.1; 340/572.4; 340/568.1
(58) Field of Classification Search .............. 340/539.1, 340/539.11, 539.13, 568.1, 571, 572.1, 572.4, 340/572.8, 10.1, 10.3; 235/375, 383, 385; 700/215, 216, 217
See application file for complete search history.

(56) References Cited

U.S. PATENT DOCUMENTS

| 690,191 A | 12/1901 | Saxe |
| 3,993,987 A | 11/1976 | Stevens |
| 4,233,595 A | 11/1980 | Landkammer |
| 4,729,626 A | 3/1988 | Stieff |
| 4,736,857 A | 4/1988 | Monico, Jr. et al. |
| 5,151,684 A | 9/1992 | Johnsen |
| 5,189,396 A | 2/1993 | Stobbe et al. |
| 5,266,925 A | 11/1993 | Vercellotti et al. |
| 5,483,666 A | 1/1996 | Yamada et al. |
| 5,491,486 A | 2/1996 | Welles et al. |
| 5,515,030 A | 5/1996 | Citron et al. |
| 5,565,858 A | 10/1996 | Guthrie |
| 5,656,996 A | 8/1997 | Houser |
| 5,710,973 A | 1/1998 | Yamada et al. |

(Continued)

FOREIGN PATENT DOCUMENTS

GB    2 368 174 A    4/2002

(Continued)

OTHER PUBLICATIONS

International Search Report and Written Opinion of the International Searching Authority, PCT Application Serial No. PCT/US2010/046655, mailed Oct. 20, 2010, 9 pp.

(Continued)

*Primary Examiner* — Van T. Trieu
(74) *Attorney, Agent, or Firm* — Fish & Richardson P.C.

(57) ABSTRACT

Techniques for tracking physical assets are described. In one aspect, input indicating that an asset has been loaded on a conveyance is received. When a tag attached to the asset is unable to transmit position fix data describing a location of the asset to a server, alternative position fix data (e.g., from the conveyance or another tag coupled to another asset on the conveyance) is used to indicate the position of the asset and tag. In another aspect, a relay component is used to receive the tag position fix data from the tag and forward it to the server.

22 Claims, 7 Drawing Sheets

U.S. PATENT DOCUMENTS

| | | | |
|---|---|---|---|
| 5,752,218 | A | 5/1998 | Harrison et al. |
| 5,758,263 | A | 5/1998 | Berger et al. |
| 5,774,876 | A | 6/1998 | Woolley et al. |
| 5,798,460 | A | 8/1998 | Nakagawa et al. |
| 5,815,407 | A | 9/1998 | Huffman et al. |
| 5,827,965 | A | 10/1998 | Nakagawa et al. |
| 5,861,810 | A | 1/1999 | Nguyen |
| 5,959,529 | A | 9/1999 | Kail, IV |
| 6,026,690 | A | 2/2000 | Nakagawa et al. |
| 6,069,563 | A | 5/2000 | Kadner et al. |
| 6,075,443 | A | 6/2000 | Schepps et al. |
| 6,243,005 | B1 | 6/2001 | Haimovich et al. |
| 6,249,252 | B1 | 6/2001 | Dupray |
| 6,265,973 | B1 | 7/2001 | Brammall et al. |
| 6,292,108 | B1 | 9/2001 | Straser et al. |
| 6,420,971 | B1 | 7/2002 | Leck et al. |
| 6,496,766 | B1 | 12/2002 | Bernold et al. |
| 6,529,131 | B2 | 3/2003 | Wentworth |
| 6,571,213 | B1 | 5/2003 | Altendahl et al. |
| 6,727,817 | B2 | 4/2004 | Maloney |
| 6,753,775 | B2 | 6/2004 | Auerbach et al. |
| 6,778,083 | B2 | 8/2004 | Auerbach et al. |
| 6,792,353 | B2 | 9/2004 | Lin |
| 6,879,962 | B1 | 4/2005 | Smith et al. |
| 6,927,688 | B2 | 8/2005 | Tice |
| 6,965,313 | B1 | 11/2005 | Saylor et al. |
| 6,972,682 | B2 | 12/2005 | Lareau et al. |
| 6,990,335 | B1 | 1/2006 | Shamoon et al. |
| 7,035,856 | B1 | 4/2006 | Morimoto |
| 7,044,374 | B2 | 5/2006 | Allison et al. |
| 7,072,668 | B2 | 7/2006 | Chou |
| 7,098,784 | B2 | 8/2006 | Easley et al. |
| 7,106,244 | B2 | 9/2006 | Hsu |
| 7,113,090 | B1 | 9/2006 | Saylor et al. |
| 7,136,830 | B1 | 11/2006 | Kuelbs et al. |
| 7,136,832 | B2 | 11/2006 | Li et al. |
| 7,164,986 | B2 | 1/2007 | Humphries et al. |
| 7,193,557 | B1 | 3/2007 | Kovacich et al. |
| 7,196,621 | B2 | 3/2007 | Kochis |
| 7,212,829 | B1 | 5/2007 | Lau et al. |
| 7,239,238 | B2 | 7/2007 | Tester et al. |
| 7,257,397 | B2 | 8/2007 | Shamoon et al. |
| 7,274,332 | B1 | 9/2007 | Dupray |
| 7,275,651 | B2 | 10/2007 | Morales et al. |
| 7,286,683 | B2 | 10/2007 | Hadell |
| 7,298,327 | B2 | 11/2007 | Dupray et al. |
| 7,312,752 | B2 | 12/2007 | Smith et al. |
| 7,315,281 | B2 | 1/2008 | Dejanovic et al. |
| 7,336,152 | B2 * | 2/2008 | Horwitz et al. ............. 340/10.1 |
| 7,336,170 | B2 | 2/2008 | Auerbach et al. |
| 7,339,469 | B2 | 3/2008 | Braun |
| 7,350,383 | B1 | 4/2008 | Kuo |
| 7,382,251 | B2 | 6/2008 | Bohman et al. |
| 7,385,500 | B2 | 6/2008 | Irwin |
| 7,385,529 | B2 | 6/2008 | Hersh et al. |
| 7,391,321 | B2 | 6/2008 | Twitchell, Jr. |
| 7,394,361 | B1 | 7/2008 | Twitchell, Jr. |
| 7,423,535 | B2 | 9/2008 | Chung et al. |
| 7,467,032 | B2 | 12/2008 | Kane et al. |
| 7,471,203 | B2 | 12/2008 | Worthy et al. |
| 7,482,920 | B2 | 1/2009 | Joao |
| RE40,642 | E | 2/2009 | Harrison et al. |
| 7,498,938 | B2 | 3/2009 | Ulrich |
| 7,499,997 | B2 | 3/2009 | Hancock et al. |
| 7,525,484 | B2 | 4/2009 | Dupray et al. |
| 7,536,321 | B2 | 5/2009 | Takahashi et al. |
| 7,616,116 | B2 | 11/2009 | Ehrensvard et al. |
| 7,623,033 | B2 | 11/2009 | Ainsworth et al. |
| 7,639,131 | B2 | 12/2009 | Mock et al. |
| 7,643,823 | B2 | 1/2010 | Shamoon et al. |
| 7,652,576 | B1 | 1/2010 | Crossno et al. |
| 7,668,532 | B2 | 2/2010 | Shamoon et al. |
| 7,688,207 | B2 | 3/2010 | Fritchie et al. |
| 7,707,076 | B1 | 4/2010 | Whiteley et al. |
| 7,714,778 | B2 | 5/2010 | Dupray |
| 7,724,138 | B2 * | 5/2010 | Horwitz et al. ............ 340/572.1 |
| 7,746,228 | B2 | 6/2010 | Sensenig et al. |
| 7,760,103 | B2 | 7/2010 | Frank |
| 7,764,231 | B1 | 7/2010 | Karr et al. |
| 7,822,580 | B2 | 10/2010 | Mustonen |
| 7,830,852 | B2 | 11/2010 | Twitchell, Jr. |
| 7,853,480 | B2 | 12/2010 | Taylor et al. |
| 7,864,061 | B2 | 1/2011 | Frank |
| 7,903,029 | B2 | 3/2011 | Dupray |
| 7,936,266 | B2 | 5/2011 | Francis et al. |
| 7,937,244 | B2 | 5/2011 | Kadaba |
| 7,973,536 | B2 | 7/2011 | Kojovic et al. |
| 7,990,270 | B2 | 8/2011 | Mostov |
| 7,990,947 | B2 | 8/2011 | Twitchell et al. |
| 8,032,153 | B2 | 10/2011 | Dupray et al. |
| 8,064,935 | B2 | 11/2011 | Shamoon et al. |
| 8,068,023 | B2 | 11/2011 | Dulin et al. |
| 8,082,096 | B2 | 12/2011 | Dupray |
| 8,135,413 | B2 | 3/2012 | Dupray |
| 8,164,458 | B2 | 4/2012 | Mostov |
| 8,217,785 | B2 | 7/2012 | Steer |
| 8,228,192 | B2 | 7/2012 | Eckert et al. |
| 2001/0022558 | A1 | 9/2001 | Karr et al. |
| 2002/0104013 | A1 | 8/2002 | Ghazarian |
| 2002/0111819 | A1 | 8/2002 | Li et al. |
| 2002/0113704 | A1 | 8/2002 | Hess |
| 2003/0126024 | A1 | 7/2003 | Crampton et al. |
| 2003/0137968 | A1 | 7/2003 | Lareau et al. |
| 2003/0146871 | A1 | 8/2003 | Karr et al. |
| 2003/0171948 | A1 | 9/2003 | Thomas et al. |
| 2003/0195791 | A1 | 10/2003 | Waller et al. |
| 2003/0222820 | A1 | 12/2003 | Karr et al. |
| 2003/0227392 | A1 | 12/2003 | Ebert et al. |
| 2003/0233189 | A1 | 12/2003 | Hsiao et al. |
| 2004/0113933 | A1 | 6/2004 | Guler |
| 2004/0124977 | A1 | 7/2004 | Biffar |
| 2004/0126015 | A1 | 7/2004 | Hadell |
| 2004/0183673 | A1 | 9/2004 | Nageli |
| 2004/0198386 | A1 | 10/2004 | Dupray |
| 2004/0199411 | A1 | 10/2004 | Bertram et al. |
| 2004/0227630 | A1 | 11/2004 | Shannon et al. |
| 2004/0246130 | A1 | 12/2004 | Lambright et al. |
| 2004/0257225 | A1 | 12/2004 | Webb et al. |
| 2004/0266457 | A1 | 12/2004 | Dupray |
| 2005/0055237 | A1 | 3/2005 | Schmidtberg et al. |
| 2005/0091091 | A1 | 4/2005 | Bjerre et al. |
| 2005/0156736 | A1 | 7/2005 | Rajapakse et al. |
| 2005/0159883 | A1 | 7/2005 | Humphries et al. |
| 2005/0190097 | A1 | 9/2005 | Hsu |
| 2005/0219037 | A1 | 10/2005 | Huang et al. |
| 2005/0248454 | A1 | 11/2005 | Hanson et al. |
| 2005/0256731 | A1 | 11/2005 | Mougey et al. |
| 2006/0047379 | A1 | 3/2006 | Schullian et al. |
| 2006/0054705 | A1 | 3/2006 | Garton et al. |
| 2006/0101897 | A1 | 5/2006 | Masuya et al. |
| 2006/0105760 | A1 | 5/2006 | Shamoon et al. |
| 2006/0109109 | A1 | 5/2006 | Rajapakse et al. |
| 2006/0116893 | A1 | 6/2006 | Carnes et al. |
| 2006/0145837 | A1 | 7/2006 | Horton et al. |
| 2006/0155591 | A1 | 7/2006 | Altaf et al. |
| 2006/0202824 | A1 | 9/2006 | Carroll et al. |
| 2006/0229895 | A1 | 10/2006 | Kodger |
| 2006/0232398 | A1 | 10/2006 | Nedblake et al. |
| 2006/0238332 | A1 | 10/2006 | Carle et al. |
| 2006/0255934 | A1 | 11/2006 | Easley et al. |
| 2006/0276201 | A1 | 12/2006 | Dupray |
| 2006/0288744 | A1 | 12/2006 | Smith |
| 2007/0043538 | A1 | 2/2007 | Johnson et al. |
| 2007/0046459 | A1 | 3/2007 | Silverman et al. |
| 2007/0056369 | A1 | 3/2007 | Griffin et al. |
| 2007/0115902 | A1 | 5/2007 | Shamoon et al. |
| 2007/0120381 | A1 | 5/2007 | Ehrensvard et al. |
| 2007/0145130 | A1 | 6/2007 | Danilewitz |
| 2007/0150379 | A1 | 6/2007 | Vernaci et al. |
| 2007/0155379 | A1 | 7/2007 | Shamoon et al. |
| 2007/0167179 | A1 | 7/2007 | Shamoon et al. |
| 2007/0182556 | A1 | 8/2007 | Rado |
| 2007/0222232 | A1 | 9/2007 | Held |
| 2007/0222674 | A1 | 9/2007 | Tan et al. |
| 2007/0252696 | A1 * | 11/2007 | Belisle et al. ............. 340/572.1 |
| 2007/0262861 | A1 | 11/2007 | Anderson et al. |
| 2007/0285232 | A1 | 12/2007 | Bohman et al. |

| | | | |
|---|---|---|---|
| 2007/0287473 | A1 | 12/2007 | Dupray |
| 2008/0006696 | A1 | 1/2008 | Piersol et al. |
| 2008/0040244 | A1 | 2/2008 | Ricciuti et al. |
| 2008/0042809 | A1 | 2/2008 | Watts et al. |
| 2008/0086391 | A1* | 4/2008 | Maynard et al. ............... 705/28 |
| 2008/0094209 | A1 | 4/2008 | Braun et al. |
| 2008/0111693 | A1 | 5/2008 | Johnson et al. |
| 2008/0113672 | A1 | 5/2008 | Karr et al. |
| 2008/0133126 | A1 | 6/2008 | Dupray |
| 2008/0143516 | A1 | 6/2008 | Mock et al. |
| 2008/0143604 | A1 | 6/2008 | Mock et al. |
| 2008/0150698 | A1 | 6/2008 | Smith et al. |
| 2008/0157974 | A1 | 7/2008 | Boss et al. |
| 2008/0167049 | A1 | 7/2008 | Karr et al. |
| 2008/0186166 | A1 | 8/2008 | Zhou et al. |
| 2008/0231459 | A1 | 9/2008 | Corder |
| 2008/0248813 | A1 | 10/2008 | Chatterjee et al. |
| 2008/0252428 | A1 | 10/2008 | Robinson et al. |
| 2008/0309487 | A1 | 12/2008 | Chao |
| 2009/0030715 | A1 | 1/2009 | Robb et al. |
| 2009/0060349 | A1 | 3/2009 | Linaker et al. |
| 2009/0083123 | A1 | 3/2009 | Powell et al. |
| 2009/0102657 | A1 | 4/2009 | Evans et al. |
| 2009/0102660 | A1 | 4/2009 | Evans et al. |
| 2009/0121877 | A1 | 5/2009 | Henderson |
| 2009/0134999 | A1 | 5/2009 | Dobson et al. |
| 2009/0135000 | A1 | 5/2009 | Twitchell, Jr. |
| 2009/0135015 | A1 | 5/2009 | Dobson et al. |
| 2009/0140886 | A1 | 6/2009 | Bender |
| 2009/0146805 | A1 | 6/2009 | Joao |
| 2009/0146832 | A1 | 6/2009 | Ebert et al. |
| 2009/0167536 | A1 | 7/2009 | Clark et al. |
| 2009/0177394 | A1 | 7/2009 | Walz et al. |
| 2009/0201169 | A1 | 8/2009 | d'Hont et al. |
| 2009/0216775 | A1 | 8/2009 | Ratliff et al. |
| 2009/0234493 | A1* | 9/2009 | Pandit et al. ................. 700/215 |
| 2009/0308000 | A1 | 12/2009 | Corcoran |
| 2009/0316682 | A1 | 12/2009 | Twitchell et al. |
| 2009/0322510 | A1* | 12/2009 | Berger et al. ............. 340/539.1 |
| 2009/0326971 | A1 | 12/2009 | Piccinini et al. |
| 2010/0012653 | A1 | 1/2010 | Ulrich et al. |
| 2010/0039284 | A1 | 2/2010 | Hall et al. |
| 2010/0045436 | A1 | 2/2010 | Rinkes |
| 2010/0066501 | A1 | 3/2010 | Ulrich et al. |
| 2010/0066561 | A1 | 3/2010 | Ulrich et al. |
| 2010/0073229 | A1 | 3/2010 | Pattabiraman et al. |
| 2010/0076902 | A1 | 3/2010 | Kraft |
| 2010/0090822 | A1 | 4/2010 | Benson et al. |
| 2010/0095864 | A1 | 4/2010 | Forbes |
| 2010/0102964 | A1 | 4/2010 | Steer |
| 2010/0116932 | A1 | 5/2010 | Helou, Jr. |
| 2010/0141393 | A1 | 6/2010 | Daniel |
| 2010/0141445 | A1 | 6/2010 | Venkatasubramaniyam et al. |
| 2010/0145739 | A1 | 6/2010 | Erhart et al. |
| 2010/0234045 | A1 | 9/2010 | Karr et al. |
| 2010/0238032 | A1 | 9/2010 | Greene |
| 2010/0277280 | A1 | 11/2010 | Burkart et al. |
| 2010/0312715 | A1 | 12/2010 | Esque et al. |
| 2011/0012731 | A1 | 1/2011 | Stevens |
| 2011/0025496 | A1 | 2/2011 | Cova et al. |
| 2011/0050397 | A1 | 3/2011 | Cova |
| 2011/0050423 | A1 | 3/2011 | Cova et al. |
| 2011/0054979 | A1 | 3/2011 | Cova et al. |
| 2011/0120199 | A1 | 5/2011 | Auerbach et al. |
| 2011/0128143 | A1 | 6/2011 | Daniel |
| 2011/0133888 | A1 | 6/2011 | Stevens et al. |
| 2011/0133932 | A1 | 6/2011 | Tan et al. |
| 2011/0258930 | A1 | 10/2011 | Francis et al. |
| 2011/0266338 | A1* | 11/2011 | Babcock et al. ............. 235/375 |
| 2011/0283750 | A1 | 11/2011 | Will |
| 2011/0289320 | A1 | 11/2011 | Twitchell et al. |
| 2012/0058775 | A1 | 3/2012 | Dupray et al. |
| 2012/0069131 | A1 | 3/2012 | Abelow |
| 2012/0094638 | A1 | 4/2012 | Shamoon et al. |
| 2012/0182180 | A1 | 7/2012 | Wolf et al. |
| 2012/0190380 | A1 | 7/2012 | Dupray et al. |

FOREIGN PATENT DOCUMENTS

| | | |
|---|---|---|
| GB | 2 448 482 A | 10/2008 |
| NZ | 541176 A | 8/2005 |
| WO | WO 03/098175 | 11/2003 |
| WO | WO 2007/121508 | 11/2007 |
| WO | WO 2010/077688 | 7/2010 |
| WO | WO 2011/008871 | 1/2011 |
| WO | WO 2011/008884 | 1/2011 |
| WO | WO 2011/014708 | 2/2011 |
| WO | WO 2011/022412 | 2/2011 |
| WO | WO 2011/025821 | 3/2011 |
| WO | WO 2011/025987 | 3/2011 |

OTHER PUBLICATIONS

International Preliminary Report on Patentability of the International Searching Authority, PCT Application Serial No. PCT/US2010/046655, mailed Mar. 8, 2012, 8 pp.

U.S. Appl. No. 13/569,862, filed Aug. 8, 2012, Cova et al.

U.S. Appl. No. 13/569,884, filed Aug. 8, 2012, Cova et al.

International Search Report and Written Opinion of the International Searching Authority, PCT Application Serial No. PCT/US2009/067210, received Feb. 4, 2010, 9 pp.

International Preliminary Report on Patentability, PCT Application Serial No. PCT/US2009/067210, received Jun. 23, 2011, 8 pp.

International Search Report and Written Opinion of the International Searching Authority, PCT Application Serial No. PCT/US2010/041994 filed Jul. 14, 2010, received Sep. 14, 2010, 12 pp.

International Preliminary Report on Patentability, PCT Application Serial No. PCT/US2010/041994 filed Jul. 14, 2010, received Jan. 17, 2012, 11 pp.

International Search Report and Written Opinion of the International Searching Authority, PCT Application Serial No. PCT/US2010/047042 filed Aug. 27, 2010, received Dec. 27, 2010, 11 pp.

International Preliminary Report on Patentability, PCT Application Serial No. PCT/US2010/047042 filed Aug. 27, 2010, received Feb. 28, 2012, 8 pp.

International Search Report and Written Opinion of the International Searching Authority, PCT Application Serial No. PCT/US2010/043795 filed Jul. 29, 2010, received Sep. 17, 2010, 11 pp.

International Preliminary Report on Patentability, PCT Application Serial No. PCT/US2010/043795 filed Jul. 29, 2010, received Jan. 31, 2012, 9 pp.

International Search Report and Written Opinion of the International Searching Authority, PCT Application Serial No. PCT/US2010/045776 filed Aug. 17, 2010, received Oct. 8, 2010, 14 pp.

International Preliminary Report on Patentability, PCT Application Serial No. PCT/US2010/045776 filed Aug. 17, 2010, received Feb. 21, 2012, 9 pp.

International Search Report and Written Opinion of the International Searching Authority, PCT Application Serial No. PCT/US2010/042014 filed Jul. 14, 2010, Received Sep. 14, 2010, 8 pp.

InternationaPreliminary Report on Patentability, PCT Application Serial No. PCT/US2010/042014 filed Jul. 14, 2010, Received Jan. 17, 2012, 7 pp.

International Search Report and Written Opinion of the International Searching Authority, PCT Application Serial No. PCT/US2010/046640 filed Aug. 25 2010, mailed Oct. 18, 2010, 9 pp.

International Preliminary Report on Patentability, PCT Application Serial No. PCT/US2010/046640 filed Aug. 25 2010, mailed Mar. 6, 2012, 8 pp.

"Hercules "Zigbee" e-Seal Bolt". Bolt eSeal Electronic Seals—TydenBrooks. Retrieved from the internet: URL<URL: http://www.tydenbrooks.com/Products/Electronic-Seals/Bolt-eSeal.aspx>, Aug. 2, 2012. 2 pages.

Bajikar, Sundeep. "Trusted Platform Module (TPM) based Security on Notebook PCs—White Paper", Jun. 20, 2002, Mobile Platforms Group, Intel Corporation. Retrieved from the internet: URL <http://www.intel.com/design/mobile/platform/downloads/Trusted_Platform_Module_White_Paper.pdf>, Aug. 2, 2012. 20 pages.

Chin, Le-Pong, et al. "The Role of Electronic Container Seal (E-Seal) with RFID Technology in the Container Security Initiatives." Proceedings of the International Conference on MEMS, NANO and Smart Systems 2004. ICMENS. Aug. 25-27, 2004. pp. 116-120.

FAQ, Trusted Computing group—Developers. Retrieved from the Internet: URL<http://www.trustedcomputinggroup.org/faq/TPMFAQ/>, Oct. 19, 2010. 2 pages.

Liaw, M. And Cova, N., "Data Quality Delivered," A Savi Networks White Paper, copyright 2006, 19 pages.

Maersk Line, "Maersk Line Shipping Containers Worldwide". Retrieved from internet: URL<http://www.maerskline.com/link/?page=brochure&path=/our_services/our_e-commerce_services/maerskline.com/the_shipping_process/tracking>, dated Aug. 19, 2009. 7 pages.

Reid Simmons et al., "Learning to Predict Driver Route and Destination Intent", Sep. 17-20, 2006, Proceedings of the 2006 IEEE Intelligent Transportation System Conference, pp. 127-132.

Siror, Joseph, et al. "Impact of RFID Technology on Tracking of Export Goods in Kenya." From Journal of Convergence Information Technology, vol. 5, No. 9. Nov. 2010. pp. 190-200.

GlobalTrak, "GlobalTrak+ Asset Monitoring Unit." GlobalTrak Product Brochure/Datasheet. Published Pre-Oct. 1, 2009. 2 pages.

* cited by examiner

ASSET TRACKING USING ALTERNATIVE SOURCES OF POSITION FIX DATA

CROSS-REFERENCE TO RELATED APPLICATIONS

This application claims the benefit under 35 U.S.C. §119(e) of U.S. Patent Application No. 61/237,964, titled "Asset Tracking Using Alternative Sources of Position Fix Data," filed Aug. 28, 2009, which is incorporated here by reference.

TECHNICAL FIELD

This subject matter is related generally to monitoring and tracking physical assets such as intermodal shipping containers.

BACKGROUND

Users often want to track physical assets from one location to another. One way of tracking an asset is to use a wireless monitoring and tracking device (hereafter referred to as "tag" or "e-Seal") coupled to the asset that provides periodic location updates. However, a tracking device may sometimes have difficulty determining its location and transmitting its location to users. For example, when the assets are shipping containers that are stacked high and deep on a cargo ship, a tracking device coupled to an asset in the middle of the stack may face interference from the surrounding assets. As another example, the structure of the conveyance itself may interfere with the tracking device.

SUMMARY

Techniques for tracking physical assets such as intermodal shipping containers are disclosed. In one aspect, input indicating that an asset has been loaded on a conveyance is received. When a tag attached to the asset is unable to adequately transmit position fix data describing a location of the asset to a monitoring and tracking service, alternative position fix data (e.g., from the conveyance or another tag coupled to another asset on the conveyance) is used to indicate the position of the asset and tag. In another aspect, when a tag attached to the asset is unable to transmit position fix data describing a location of the asset to the service, a relay component is used to receive the tag position fix data from the tag and forward it to the service.

Particular embodiments of the subject matter described in this specification can be implemented to realize one or more of the following advantages. Assets can be tracked even when they are stacked or otherwise shipped in configurations that make it difficult for tags coupled to assets to transmit position fix data. Asset tracking can be performed in real-time. When events occur during shipment of the asset, and a tag attached to the asset is unable to report the events when they occur, the events can later be associated with an accurate position fix for the asset at the time the events occurred.

DETAILED DESCRIPTION

Overview of Asset Tracking

Figure 1:
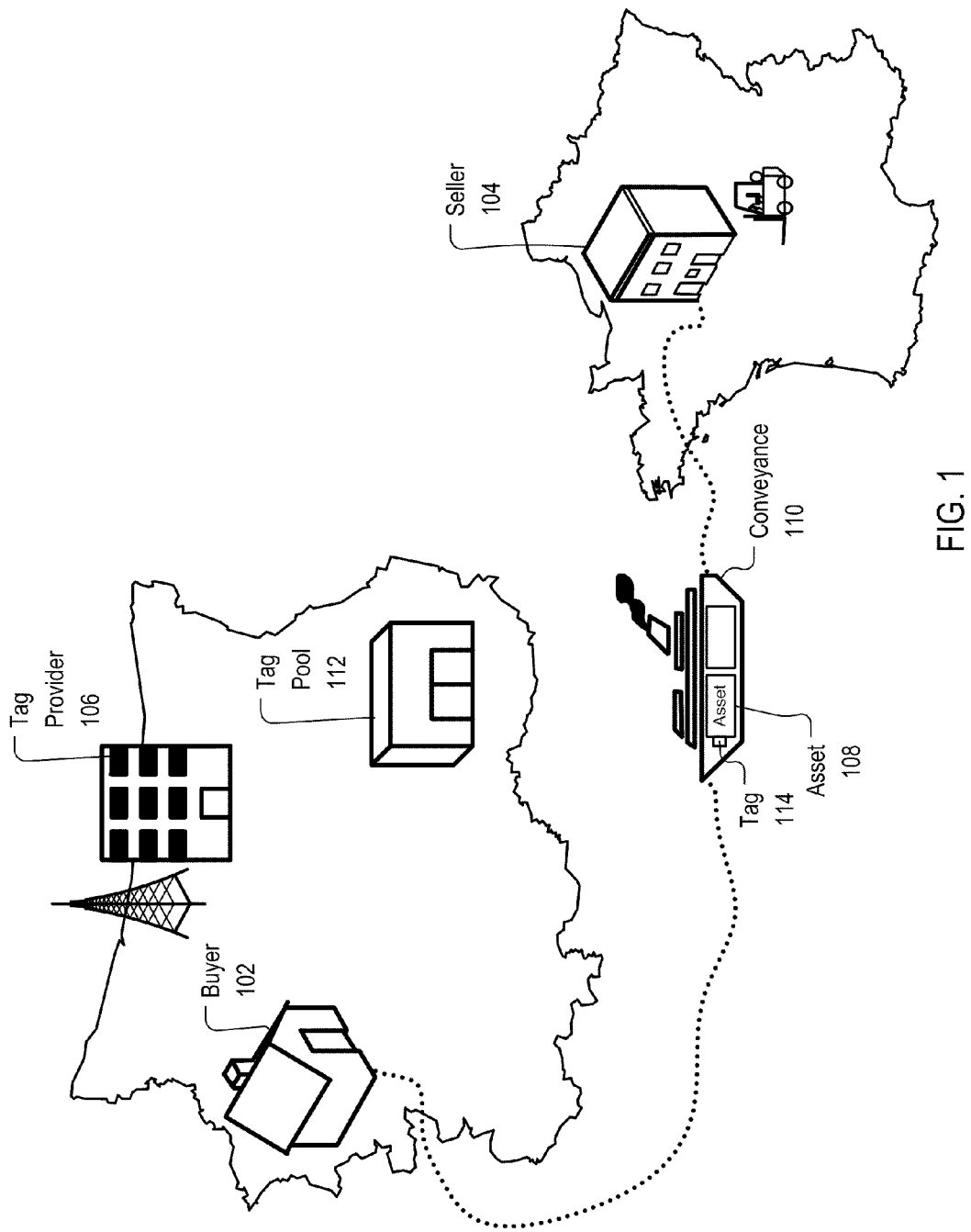
FIG. 1 illustrates an example buyer, seller, and tag provider interacting in a shipping scenario.

FIG. 1 illustrates an example buyer 102, seller 104, and tag provider 106 interacting in a shipping scenario. An example asset 108 is shipped from the seller 104 to the buyer 102 on example conveyance 110. In some implementations, the asset is an intermodal shipping container, however the asset can also be, for example, equipment, or other items capable of being monitored or tracked. Examples of conveyances include, but are not limited to, trucks, trains, ships, and airplanes. Examples of assets include, but are not limited to, containers such as dry-van containers, refrigerated containers, ISO tanks, trailers, box trucks, and unit load devices (ULDs).

In general, either the buyer 102 or the seller 104 sends a request to the tag provider 106 requesting tracking of the shipment of the asset 108. The tag provider 106 arranges for a selected tag 114 to be sent from tag pool 112 to the location from where the asset is being shipped (e.g., a warehouse of the seller 104). The tag pool 112 is a collection of available tags. Each tag in the tag pool 112 is a tracking device that can be used to track an asset. At the location where the tag is shipped (the "origin location") the tag 114 can be affixed or coupled to the asset 108, thus securely sealing the asset 108. An example tag is the Savi Networks SN-LSE-01, which is a GPS-based Location+Security+Environmental tag. The tags do not have to use GPS, but can alternatively or additionally receive location information using various location technologies including, but not limited to: wireless networks, triangulation from cellular towers, or WiFi networks (e.g., Skyhook Wireless™ technology).

The selected tag 114 can be coupled to the asset 108 before the asset begins its journey or re-coupled to the asset 108 during the journey (e.g., after authorized custom inspections). During the journey, the tag 114 can be programmed to wake up periodically, initiate communication with the tag provider 106, and send event notifications to the tag provider 106. In general, each event notification can include an identification of the event (or event type), a location of the asset 108 when the event occurred, and additional details of the event such as a date and/or time when the event occurred, the status of the asset 108 before, during, or after the event, or details on the movement of the asset (e.g., accelerometer readings from the tag coupled to the asset). The event information can be stored by the tag provider 106, for example, in an event database. The tag 114 reports various events, including for example, security events, environmental events, process events, and tracking events. Security events can indicate that the asset 108 or tag 114 may have been tampered with. For example, the tag 114 can report when a vertical or horizontal bolt securing the tag 114 to the asset 108 is cut (indicating that the asset 108 was opened). Other types of tampers can also be detected (e.g., shock intrusion or light inside the asset that exceeds a threshold). Environmental events can indicate that one or more environmental variables (e.g., temperature, humidity, shock, acceleration) are beyond an acceptable range (e.g., a range specified by the user). Process events indicate that various procedural events in the journey of the asset have occurred. For example, process events can indicate that a tag 114 has been attached to the asset 108 or detached from the asset 108 (e.g., that the asset 108 is beginning or ending its tagged journey). Process events can also indicate other shipment events in the journey of the asset 108 (e.g., procedural events in the journey of the asset 108), including, but not limited to, that the asset 108 has been stuffed (e.g., filled with contents), that the asset 108 has been sealed, that the asset 108 has been flagged for customs inspection, that customs inspection of the asset 108 has begun, that customs inspection of the asset 108 has ended, that the asset 108 is in a shipping yard, that the asset has left a shipping yard, that the asset 108 has sailed, that the asset 108 has been berthed, and that the asset 108 has been unsealed. Tracking events are periodic reports of the tag's 114 location. For example, the tag 114 can send a report of its current location according to a schedule, for example, at fixed intervals of time, regardless of whether any other events have been issued. A tracking system (e.g., system 200 of FIG. 2) can process the tracking events to determine when an asset has entered or left a predefined area. For example, the system 200 can define geofences (e.g., a virtual perimeter) around important locations along the journey of the asset 108 (e.g., ports) and the tag 114 can report a process event when the tag 114 enters, leaves or persists in a geofence.

In some implementations, the tag provider 106 processes the various event notifications received from the tag 114 and provides notifications to the buyer 102 and/or the seller 104 and/or other parties. The notifications can be based, in part, on additional information received from the buyer 102 and/or the seller 104, for example, a description of the business of the buyer 102 and/or seller 104, a description of the contents of the asset 108, or a description of a transaction relevant to the contents of the asset 108.

In some implementations, the tag 114 also processes commands (e.g., Over-the-Air (OTA) commands) received from the tag provider 106 during a communication session between the tag 114 and servers operated by the tag provider 106.

Example Tag System

Figure 2:
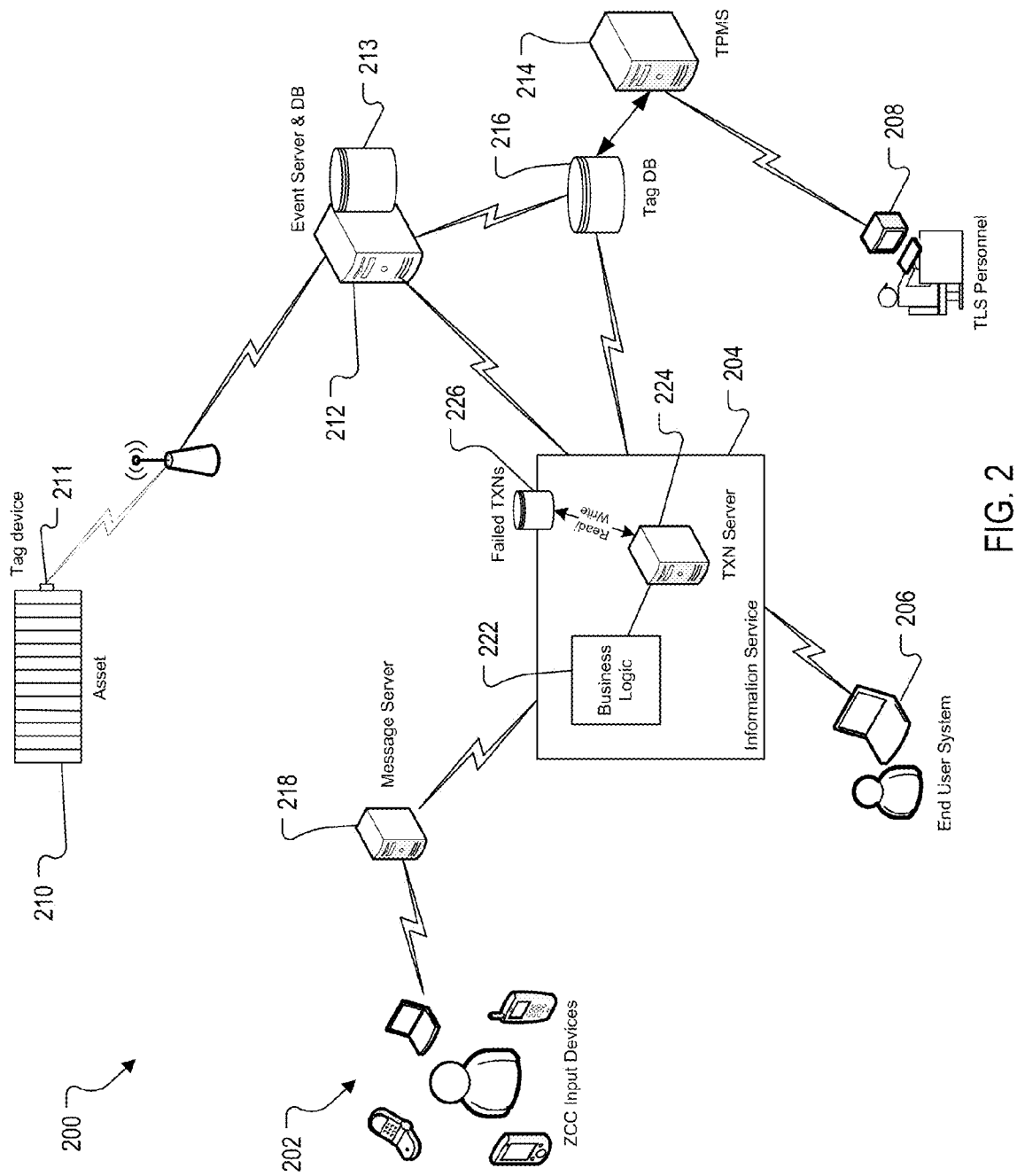
FIG. 2 is a block diagram of an example tag system that associates a tag with an asset and monitors and tracks the asset using data received from the tag.

FIG. 2 is a block diagram of an example tag system 200 that associates a tag with an asset and monitors and tracks the asset using data received from the tag. The system 200 commissions (associates) tags to assets, decommissions (disassociates) tags from assets, provides notifications of events (e.g., security, environmental, process, and tracking events), and can reset tag status remotely.

In some implementations, the system 200 can include one or more Zero Client Commissioning (ZCC) input devices 202, an information service 204, one or more end user systems 206, Tag Logistics Personnel (TL Personnel) 208, one or more assets 210, one or more tags 211 affixed or coupled to the one or more assets 210, an event server 212, an event database 213, a Tag Pool Management System (TPMS) 214, a tag database 216, a message server 218, a transaction (TXN) server 224, and a failed transaction database 226.

The ZCC input devices 202 are used to commission and decommission tags to assets. The ZCC input devices 202 can be any suitable communication device, including, but not limited to, mobile phones, land phones, email devices, and portable computers. The ZCC input devices 202 communicate with the information service 204 through the message server 218 using a variety of communication modes, including but not limited to: Integrated Voice Response (IVR), Short Message Service (SMS), email, hand-held application, Web interface, and Electronic Data Interchange (EDI) or any other form of electronic message sharing. The ZCC input devices 202 can be operated by various actors having various roles in the supply chain, including but not limited to: dock workers, longshoreman, logistics service providers, freight forwarders, field agents, customs agents, and any other personnel involved in the tracking of an asset.

The information service 204 allows end user systems 206 to track the status of assets 210 in real-time. The transaction server 224 runs a tracking application that receives event location/status transaction messages (e.g., event notifications) or reports from the event server 212 and applies business logic 222 to the transactions for validating and maintaining associations between tag identifiers and asset identifiers. Successful transactions are posted against assets and tags. Failed transactions and reason codes are written to an exception queue in the failed transaction database 226.

The information service 204 can use a portal (not shown) to provide Web forms to end user systems 206 (e.g., a browser on a PC or mobile device). The Web forms can provide an input mechanism for a user to commission or decommission tags and can provide an output mechanism for users to receive real-time tracking and status information regarding assets and events. An example information service 204 is SaviTrak™ provided by Savi Networks, LLC (Mountain View, Calif.).

The tag 211 wakes up periodically to initiate communication with the event server 212 and to send event notifications to the event server 212. In general, each event notification includes an identification of the event (or event type), a location of the asset when the event occurred, and optionally additional details of the event such as the status of the asset before, during, or after the event. The event notification can also include an identification of the tag, or an identification of the asset to which the tag is coupled. The event information can be stored in the event database 213. The tag 211 reports various events, including for example, security events, environmental events, process events, tracking events, and location events, as described above with reference to FIG. 1.

The event server 212 periodically receives event notifications from the Tag 211. The event server 212 also constructs and sends commands to the tag 211. Some notification management functions performed by the event server 212 include but are not limited to: checking incoming notifications for syntax errors and population of mandatory fields, checking the accuracy of location information in incoming notifications, sorting or sequencing notifications logically before forwarding the notifications to the information service 204, and constructing output transactions that comply with processing logic. The event server can receive and stores GPS fixes. The tag 211 can receive GPS fixes during a window of time (e.g., every half-an-hour for four hours), and then send the position fixes received during the window of time to the event server during a communication session. The event server 212 can maintain the position fixes from the previous communication session (or previous communication sessions) and can also maintain the last good fix (e.g., the last accurate fix received from the Tag, or a position fix whose location has been corrected by the system).

In some implementations, the TPMS 214 maintains an inventory of tags in the tag database 216. The TPMS 214 also maintains the association of the asset identifier (ID) and tag ID and the logical state or status of each tag, such as 'In Use,' 'Available,' 'Begin Journey', 'End Journey', etc. The TPMS 214 also maintains the allocation and availability of tags for logistics and pre-positioning purposes, and may track the health of tags stored in inventory.

In some implementations, the TPMS 214 allows TL personnel 208 to perform housekeeping functions, such as tag forecasts, ordering new tags, detecting lost tags, billing management, salvage and environmental disposal of failed tags, inventory tracking, customer help desk and financial accounting. The TPMS 214 allows TL personnel 208 to monitor the state of a tag 211 'in journey', trouble shoot causes for failure in communicating with the event server 212, and locate lost tags. The TPMS 214 provides analytic tools to monitor tag network performance (e.g., GPS/GPRS coverage/roaming area for trade lanes).

The tag system 200 is one example infrastructure. Other infrastructures are also possible which contain more or fewer subsystems or components than shown in FIG. 2. For example, one or more of the servers or databases shown in FIG. 2 can be combined into a single server or database. As another example, tags can be associated with assets using dedicated handheld devices.

Example Journey of an Asset

Figure 3:
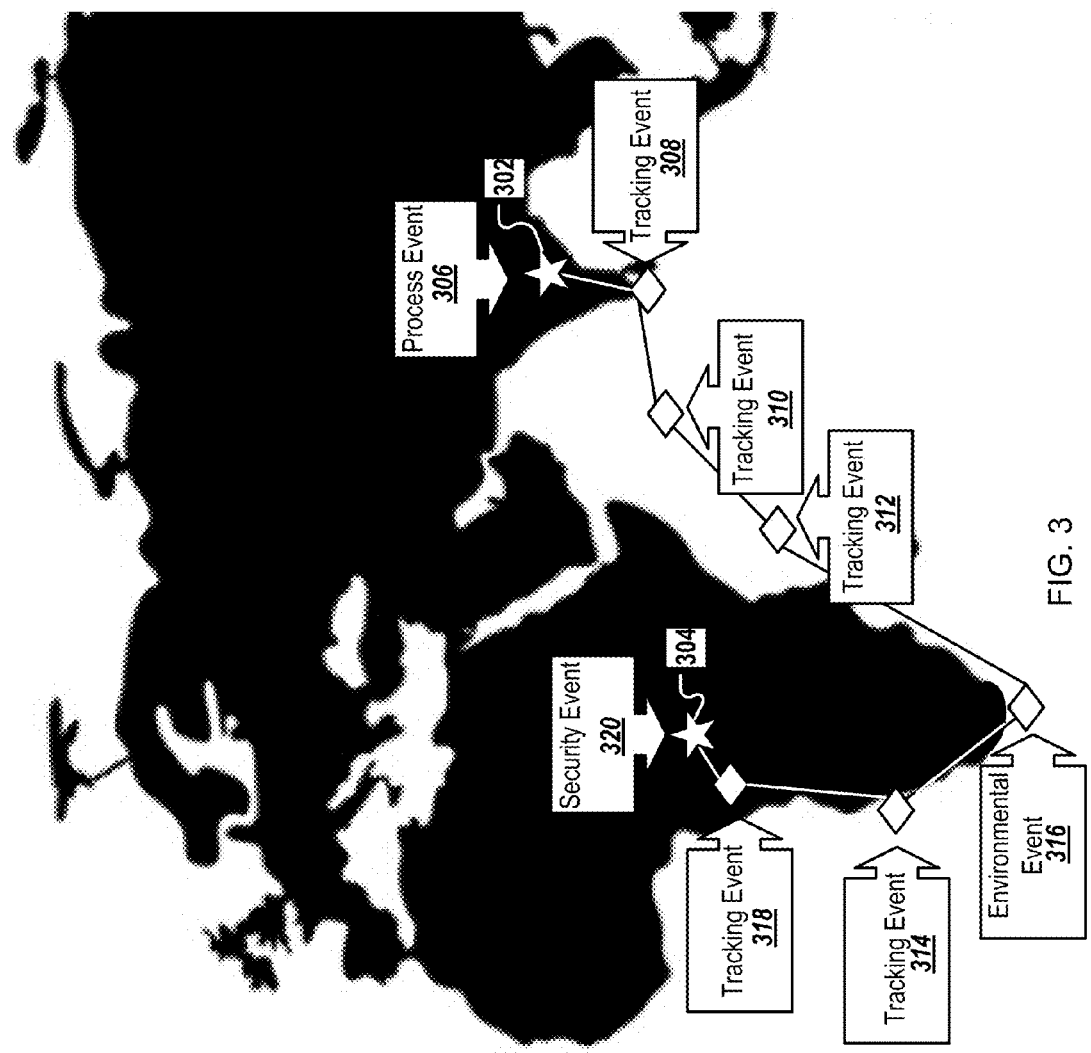
FIG. 3 illustrates an example journey of an asset from a origin location to a destination location.

FIG. 3 illustrates an example journey of an asset from a origin location 302 to a destination location 304. As the asset travels from the origin location 302 to the destination location 304, a tag associated with the asset issues various event notifications. These event notifications are received and processed by an event server (e.g., event server 212).

When the tag is first coupled to the asset, the tag generates a process event notification 306 indicating that the tag is being commissioned (e.g., associated with the asset) and that the tag and the asset are beginning their journey. Process events generally occur at known locations, such as a warehouse from which the asset is being shipped. These locations can optionally be associated with geofences that define the boundaries of the locations.

As the asset continues on its journey, the tag periodically generates tracking event notifications associated with tracking events (e.g., tracking events 308, 310, 312, 314, and 318). These event notifications provide updates on the current location of the asset, and can be used by the system to obtain useful information such as the path that the asset has traveled from its origin, remaining distance or estimated time to the destination, and the current location of the asset. Some of the tracking events (e.g., tracking events 308 and 318) can be used to determine that the asset has entered or left a port or other designated area (e.g., because the location is now inside or outside a geofence associated with the designated area).

In this specific example shipment route, as the asset rounds the Cape of Good Hope at the southern tip of Africa, the tag generates a notification for an environmental event 316. The environmental event 316 indicates that a particular environmental condition (e.g., temperature, humidity) has either exceeded or fallen below an acceptable range.

The asset eventually arrives at the destination location 304. The asset is opened before the tag is decommissioned, and the tag generates a notification for a security event 320 indicating that the asset has been opened or tampered with. In some implementations, when the system 200 receives the security event notification, the system 200 checks to see if the location of the security event 320 is inside a geofence corresponding to the destination location 302. If so, the system 200 can automatically determine that the asset's journey has ended. In other implementations, the tag can be decommissioned before it is opened, and the tag can generate a process event notification and send the notification to an event server (e.g., the event server 212) indicating the end of the journey instead of the security event.

Each event notification described above includes a position fix. The system 200 receives and processes each event notification and provides information to end user systems (e.g., using an information service like the information service 204). The information can include event notifications (e.g., identifying the type of event, the asset, the positional fix, and the date/time of the event). The information can also include additional information extracted from or associated with the event (e.g., a map of the route taken by the asset for a location event, or an association between an event and the contents of an asset associated with the event).

The above description of the asset's journey assumed that the tag was able to ascertain its position and communicate with the event server when necessary. However, tags are not always able to do so, as FIG. 4 illustrates.

Example Configuration of Assets While on a Conveyance

Figure 4:
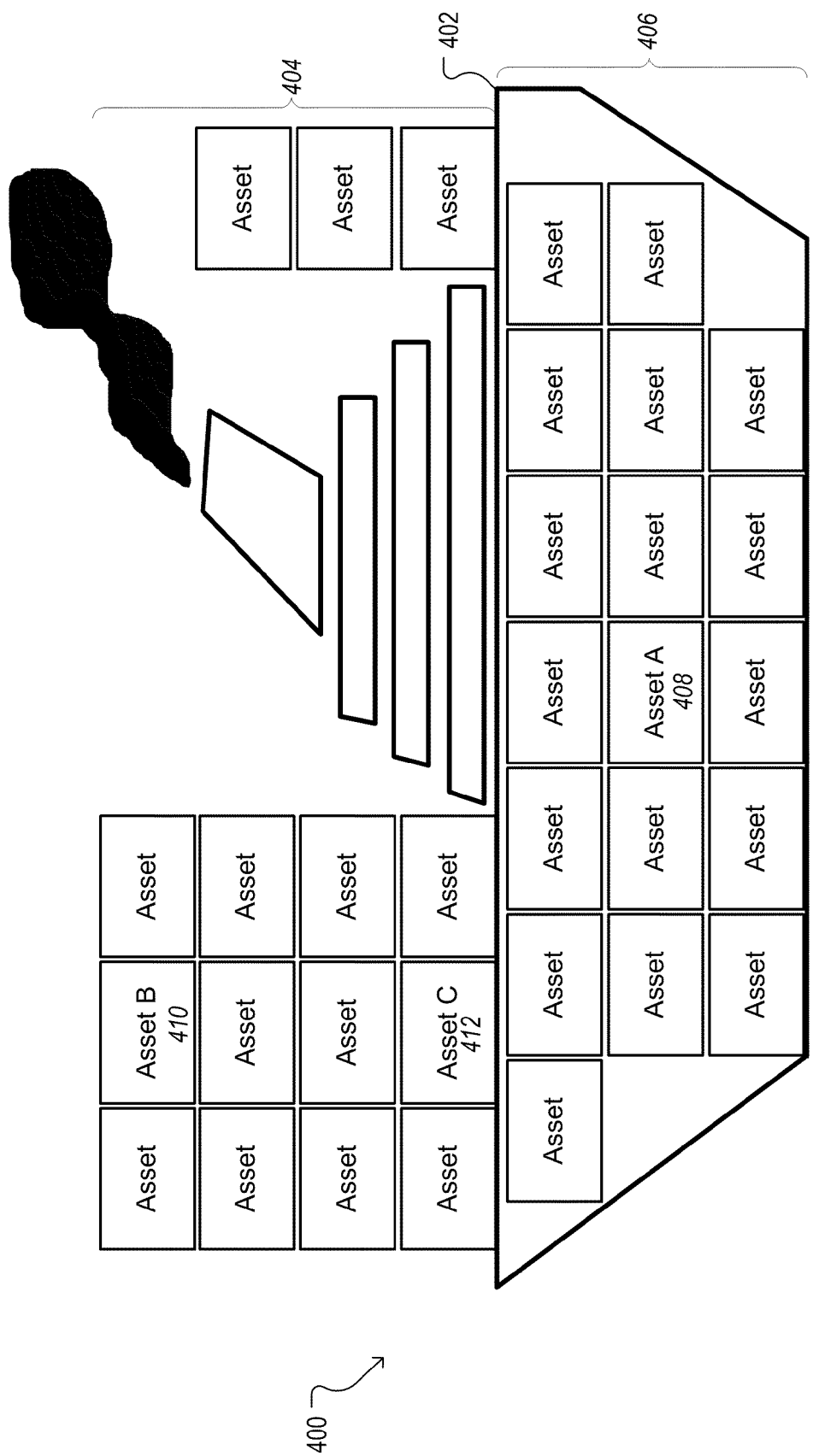
FIG. 4 is a cut-away illustration of an example configuration of assets on a ship.

FIG. 4 is a cut-away illustration of an example configuration of assets on a ship 400. The ship 400 illustrated in FIG. 4 is an example conveyance.

The ship in FIG. 4 has a deck 402 that separates the above-deck area 404 from the below-deck area 406. The deck 402 can be made of a material that blocks transmittal of radio, cellular, satellite, and other messages between tags attached to assets below deck and anything above deck. When the deck is made of this kind of material, tags attached to assets below deck 406 (e.g., asset A 408) cannot receive GPS or other location data to determine their locations, and cannot send event notifications and/or position fix data to the event server 212.

Assets that are above deck 404 are not blocked from communicating with the event server 212 by the deck 402. Many above deck assets, for example, asset B 410, are able to receive location data and are able to send event notifications and/or position fix data to an event server. However, when the assets are made of metal and stacked several assets high, and several assets deep in both directions, the metal assets on the outside of the stack can cause interference for the tags coupled to assets in the middle of the stack. For example, asset C 412 is surrounded by assets, and therefore can have trouble communicating with location data sources or the event server 212.

Other conveyances can have similar, or different, configurations of assets, that lead to communication problems for tags that are similar to what is described above. For example, when assets are transported on a tractor trailer having several trailers, the dense clustering of assets can interfere with the ability of tags in the middle of the trailer to communicate with location data sources or the event server 212.

The system 200 can handle the inability of the tag to communicate with the event server 212 in two ways. First, the transaction server 224 can use position data from another source associated with the conveyance, or with the given asset. Second, the event server 212 can receive signals from a relay, which in turn receives signals from a tag on the asset. These two approaches are discussed in more detail below.

Figure 5:
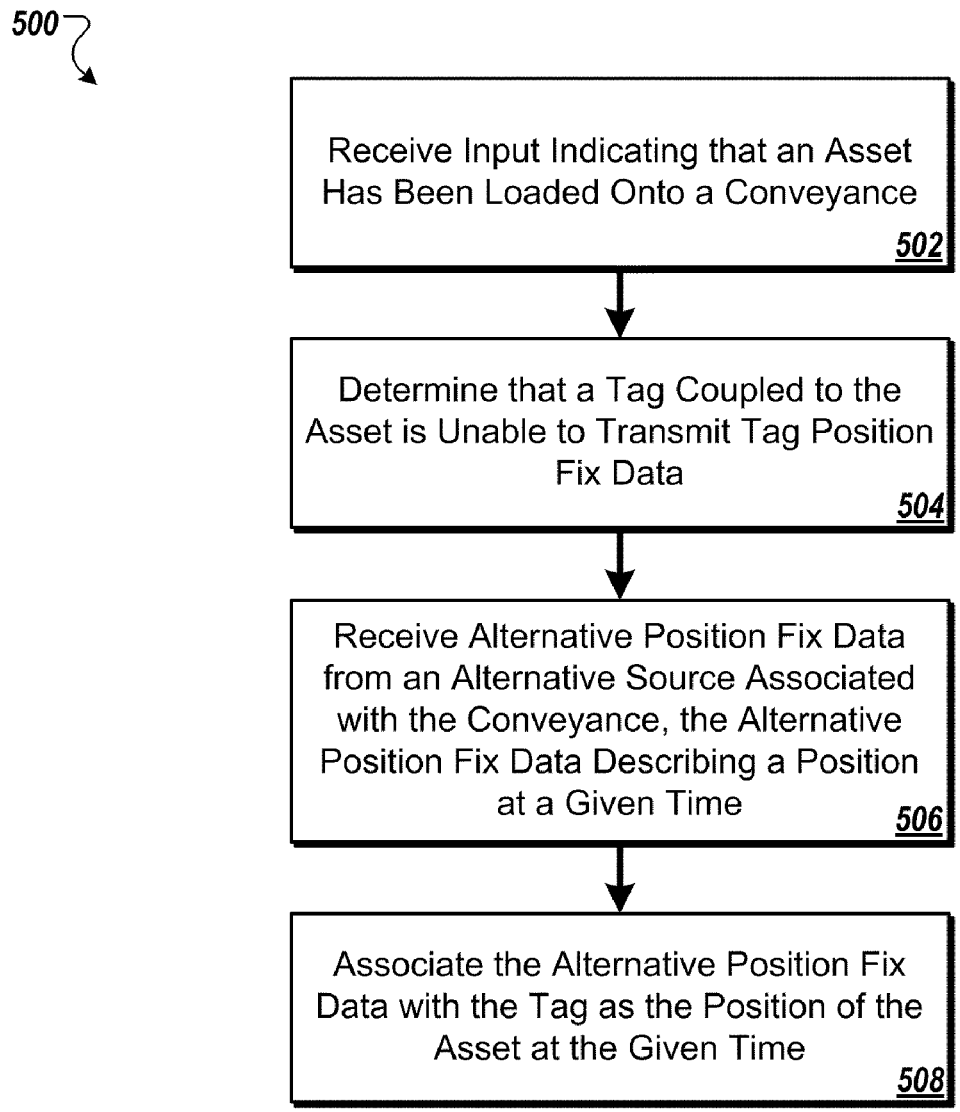
FIG. 5 is a flow diagram of an example process for associating alternative position fix data with a tag coupled to an asset.

Example Process for Associating Alternative Position Fix Data with a Tag Coupled to an Asset FIG. 5 is a flow diagram of an example process 500 for associating alternative position fix data with a tag coupled to an asset. For convenience, the process will be described in reference to a system that performs the process. The system can be, for example, the system 200. The steps of process 500 need not occur sequentially or in the order described below.

The system receives input indicating that an asset has been loaded onto a conveyance (502). The input can be received from various sources. In some implementations, a terminal operator's system receives notifications indicating that particular assets have been loaded onto a conveyance, processes the notifications, and sends the notifications to a carrier. The carrier processes the notifications and sends them to an end user. In other implementations, a tag associated with the asset generates an event notification when the asset is loaded onto the conveyance. In other implementations, the system receives sensor readings from one or more sensors on the tag (e.g., accelerometer, gyroscope, velocimeter, etc.) and compares the sensor readings to sensor readings known to occur when an asset coupled to a tag is loaded onto a conveyance. For example, the system can generate a signature from the sensor readings and compare the signature to stored signatures for various types of load events. The system can also determine that an asset has been loaded onto a conveyance from other messages received for the asset, for example, a container gate-in/gate-out report message (CODECO) or an EDI 315 event message indicating that the asset has been loaded onto the vessel. These messages can be received through the message server 218. The system can also determine that an asset has been loaded onto a conveyance from a comparison of a position fix received for the asset, and location information for the conveyance, at the time of the position fix for the asset. If the asset and the conveyance are within a threshold distance (e.g., the length of the conveyance), then the asset can be determined to have been loaded onto the conveyance. The location of the conveyance can be determined, for example, as described below.

The system determines that a tag coupled to the asset is unable to transmit tag position fix data (504). The system can determine that a tag coupled to the asset is unable to transmit tag position fix data, for example, when the system does not receive position fix data from the tag for a given time period (e.g., 2 hours, 4 hours, etc.), or if the system does not receive position fix data from the tag for a given time period after the asset was loaded onto the vessel. Alternatively, or additionally, the system can determine that a tag is unable to transmit tag data from an examination of a stow plan for the conveyance. In general, a stow plan indicates where each asset will be stowed on the conveyance. The system can analyze the stow plan to determine which assets are stowed in a location where the tag coupled to the asset will be unable to communicate with the event server 212. For example, tags coupled to assets stowed below deck, or in the middle of large stacks of assets (as described above with reference to FIG. 4) may not be able to communicate with the event server 212.

In some implementations, the system alternatively compares the signal strength with which the tag is transmitting data to a threshold in order to determine that the tag is unable to transmit data with a signal strength that satisfies, e.g., is above, the threshold. The system can interpret the low signal strength as an indication that though the tag is currently able to transmit some data, the connection is not adequate. For example, the low signal strength can be an indication that data transmittal will be slow, or that the tag may not have a continuous connection to the system. The threshold can be determined, for example, empirically. In some implementations, the threshold is zero, so that only tags that are completely unable to transmit data are identified as tags that are unable to transmit data with a signal strength that satisfies the threshold.

The system receives alternative position fix data from an alternative source associated with the conveyance, the alternative position fix data describing a position at a given time (506).

In some implementations, the alternative source is a device on the conveyance and the alternative position fix data is conveyance position fix data. For example, the system can intercept messages sent from a device on the conveyance (e.g., satellite communication, or SATCOM, messages) indicating a location of the conveyance. In some implementations, the messages use an encrypted identifier to identify the conveyance. The system can map the encrypted identifier to the identity of the conveyance, for example, from data received from a carrier responsible for shipping the asset, a company that owns the conveyance, or another source. Alternatively or additionally, other techniques for receiving the position fix data can be used. For example, the system can receive position messages from the enterprise that controls the conveyance, or can receive location data from a third party conveyance location service that provides conveyance location data, for example, sailwx provided by Mobile Geographics LLC of Seattle, Wash., or purplefinder, provided by Pole Star Space Applications Limited, of London, UK.

In some implementations, the alternative source is an alternative tag coupled to an alternative asset on the conveyance, and the alternative position fix data is tag data from the other tag. The system can identify other assets on the conveyance, for example, from data indicating what assets have been loaded onto the conveyance (and not unloaded) or from data describing a stow plan for the conveyance. The data describing what assets have been loaded onto the conveyance can be received, for example, as described above with reference to step 502.

The system can identify a group of alternative assets that were all loaded onto the same conveyance (or who are stowed on the same conveyance, according to the stow plan) and then select an alternative asset. Various techniques can be used to select the alternative asset. In some implementations, the system selects an alternative asset that is coupled to a tag having the strongest connection to the event server, or that is stowed in a location where it is likely to have the strongest connection to the event server. The system can also select an alternative asset that is coupled to a tag that has a strong GPS signal, or that is stowed in a location where it is likely to have a strong GPS signal. Selecting the alternative asset in one, or both, of these ways allows the system to increase the possibility that it will continue to receive notifications from the alternative asset throughout the journey. In some implementations, the system selects an alternative asset that will be on the conveyance for at least as long as the asset for which data is needed. Selecting the alternative asset in this way allows the system to decrease the number of times it selects an alternative asset. The system can determine that an alternative asset will be on the conveyance for at least as long as the asset for which data is needed, for example, based on a comparison of the expected routes for the alternative assets and the asset for which tag data is not being received. The route data can be received, for example, from the carriers responsible for transporting the asset.

The system associates the alternative position fix data with the tag as the position of the asset at the given time (508). In some implementations, the system stores the alternative position fix data in a database that associates tags (and/or the asset associated with the tag) with position data. The system can optionally store data in the database that indicates that the position fix data is alternative position fix data, and not data received from the tag itself.

In some implementations, the system monitors for input indicating that the asset has been removed from the conveyance. The system can repeat steps 506 and 508 until the input is received. The input can be received for example, much as the input indicating that the asset has been loaded onto a conveyance is received.

In some implementations, the system monitors for input indicating that the alternative position source is no longer reliable. For example, when the alternative position source is an alternative asset, the system can monitor for input indicating that the alternative asset has been removed from the conveyance or that the tag coupled to the alternative asset is no longer able to transmit tag position fix data. The system can repeat steps 506 to 508 until the input is received, at which point, the system can select a new alternative position source.

In some implementations, at a later time, the system receives an event notification from the tag. The event notification corresponds to a past event that happened at a past time. The system determines the position of the asset at the past time from the alternative position fix data that was associated with the tag. In some implementations, the system determines the position of the asset at the past time by using the alternative position fix data corresponding to the past time (e.g., data for the time itself, or data from a time that is the closest to the past time). Alternatively, the system can determine the position of the asset at the past time by interpolating between alternative position fix data from available times or extrapolating from alternative position fix data from available times. The system can interpolate a given position fix from the position fix data from position fixes preceding the given position fix and succeeding the given position fix (and optionally the speed of the asset at those position fixes). The system can extrapolate a position fix from position fix data for position fixes preceding the given position fix in time (and optionally the speed of the asset at those position fixes).

Example Relays for Transmitting Tag Position Fix Data

Figure 6A:
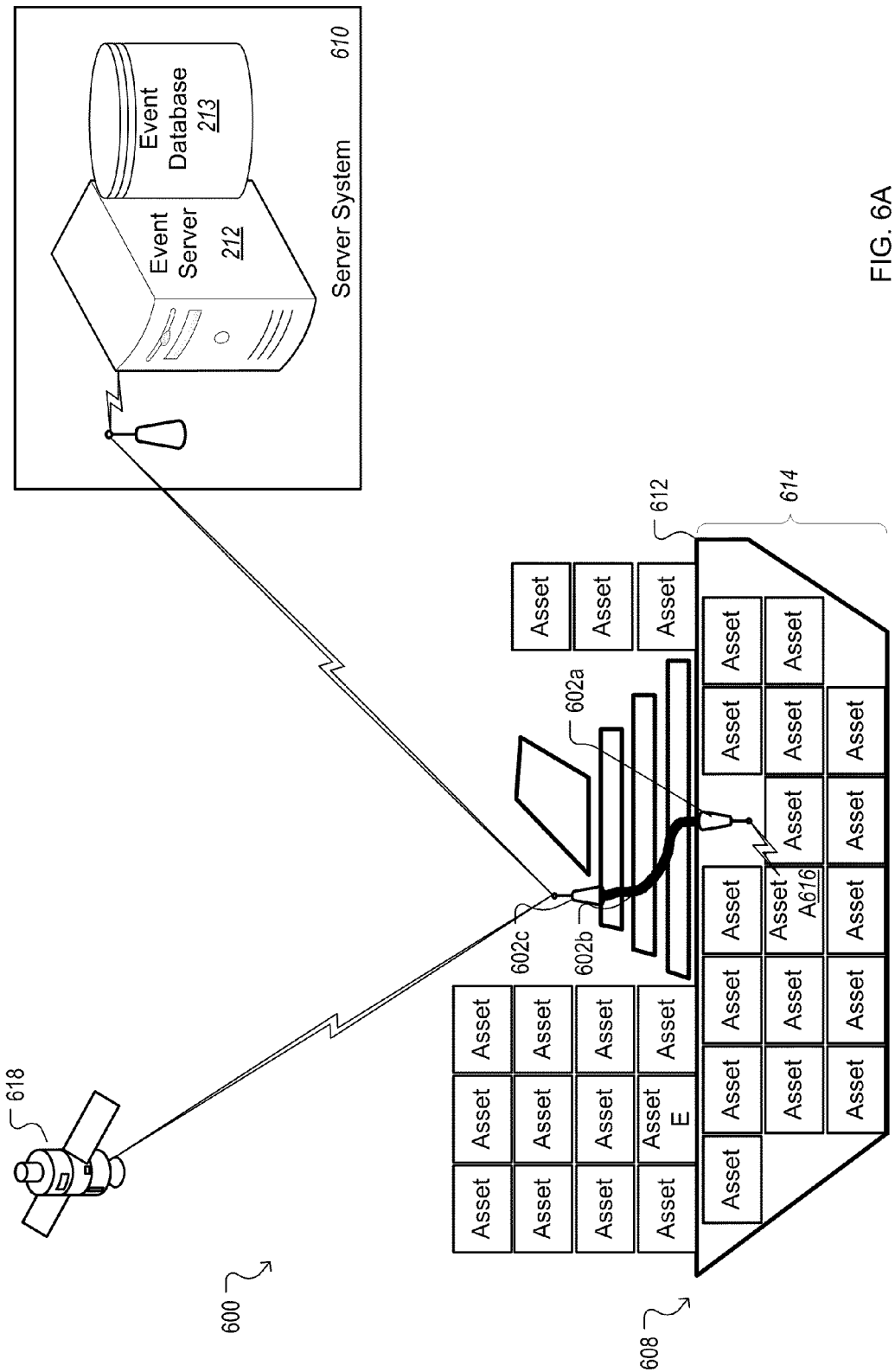
FIGS. 6A and 6B illustrate example configurations of systems including a relay for transmitting tag position fix data.
Figure 6B:
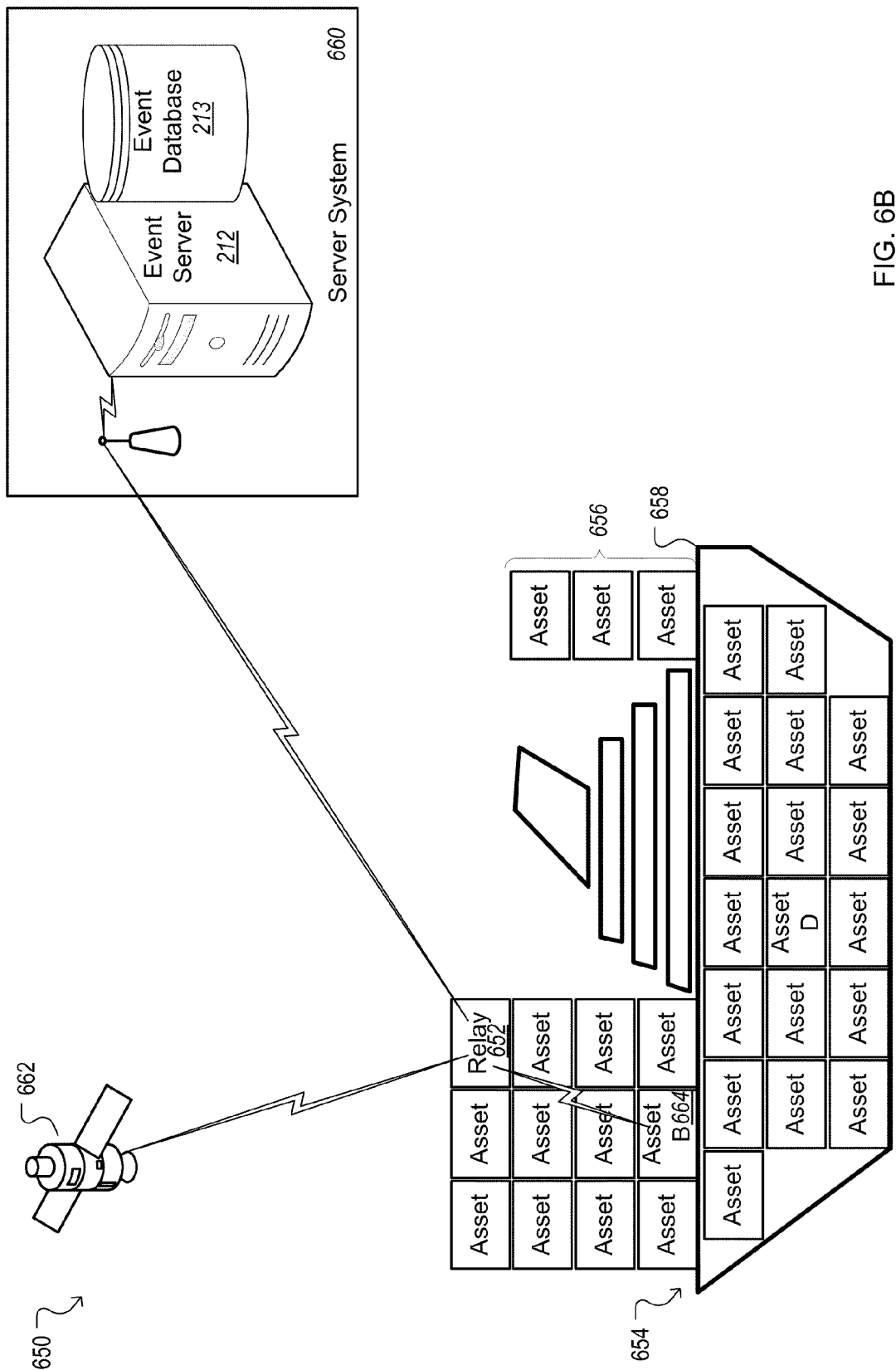

FIGS. 6A and 6B illustrate example configurations of systems including a relay for transmitting tag position fix data.

FIG. 6A illustrates an example system 600 including a relay (602, 604, and 606) attached to a conveyance (ship) 608. The relay 602 is operable to transmit tag data to a server system 610 including, for example, the event server 212 and the event database 213, and to transmit location data to assets on the conveyance.

The relay includes three components: a tag communication unit 602a, a connection 602b, and an outside communication unit 602c. The tag communication unit 602a is attached below the deck 612 of the ship 608, and is operable to receive tag data from assets below deck 614 (e.g., asset A 616). The connection 602b transmits data from the tag communication unit 602a to the outside communication unit 602c. The outside communication unit 602c transmits received tag data to the server system 610 and can receive location data (e.g., GPS data from one or more GPS satellites 618) and send the data through the connection 602b to the tag communication unit 602c. The tag communication unit 602a then transmits the location data to tags coupled to assets that are below deck 614.

The tag communication unit 602a can receive tag data from tags coupled to below-deck assets (e.g., asset A 616) and transmit location data to tags coupled to below-deck assets using various communication technologies including, for example, RFID, Bluetooth™, wireless network, ultra wideband, z wave, and ZigBee™ technologies. In some implementations, the tag communication unit 602a receives an identifier from a tag coupled to the asset. The identifier can identify, for example, the tag or the asset the tag is coupled to, and can be received as part of the tag data or in addition to the tag data.

The connection 602b connects the tag communication unit 602a and the outside communication unit 602b and allows communications between the two units. The connection 602b allows signals to pass through the deck 612 and can be, for example, a cable (e.g., coaxial, optical) connecting the tag communication unit 602a and the outside communication unit 602b. Alternatively, the connection 602b can be a wireless connection capable of traveling through the deck 612. For example, the connection 602b can be a high-power wireless signal such as ZigBee™ RuBee, or LF-band signals.

The outside communication unit 602c transmits tag data to the server system 610 using, for example, cellular networks, wireless networks, satellites, and other communication networks. The outside communication unit 602c may also receive an identification of a given tag along with tag data for the tag. If the identification is separate from the tag data, the outside communication unit 602c can transmit both the tag data and the tag identifier to the server system 610. The outside communication unit 602c can also receive location data. For example, the outside communication unit 602c can include a receiver box operable to receive GPS signals from a GPS satellite 618.

FIG. 6B illustrates an example system 650 including a relay 652 on a conveyance 654. The relay can be a free-standing relay that can be loaded onto the conveyance 654 along with the assets, or can be a relay coupled to the conveyance. The relay 652 is operable to receive tag data from assets 656 that are in an area 656 above the deck 658, and transmit the tag data to a server system 660 including, for example, the event server 212 and the event database 213. In some implementations, the relay 652 is also operable to receive location data, for example, GPS data from one or more GPS satellites 662. The relay 652 can communicate with tags coupled to assets that are in the area 656 above the deck 658 (e.g., asset B 664), for example, much as the tag communication unit 602 described above with reference to FIG. 6A communicates with below deck assets. The relay 652 can receive location data and communicate with the server system 660 much as the outside communication unit 606 described above with reference to FIG. 6A does.

When the relay is a free-standing relay that is loaded onto the conveyance, the relay 652 is positioned in the stack of assets so that it is both able to communicate with many assets on the conveyance, communicate well with the server system 604, and receive location data. For example, the relay 652 can be positioned at the top (or near the top) of a stack of assets, as shown in FIG. 6B. The relay can also be positioned on the side of a stack of assets. In some implementations, the relay 652 is configured to have the same size and shape as other assets on the conveyance. This allows the relay to be stowed on the conveyance without affecting how assets are stacked on the conveyance. When the relay is coupled to the conveyance, the relay can be coupled alongside other communications equipment on the conveyance, for example, to the tower of a vessel or alongside a vessel's Automated Identification System.

The features described above can be implemented in digital electronic circuitry, or in computer hardware, firmware, software, or in combinations of them. The features can be implemented in a computer program product tangibly embodied in a computer readable medium, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving input indicating that a first asset has been loaded onto a conveyance;
determining that a first tag coupled to the first asset is unable to transmit tag position fix data describing a position of the first asset with a signal strength that satisfies a threshold;
receiving alternative position fix data from an alternative source associated with the conveyance, the alternative position fix data describing a particular position at a given time; and
associating the alternative position fix data with the position of the first asset at the given time.

2. The method of claim 1, wherein the alternative source is a device on the conveyance, and the alternative position fix data is conveyance position fix data for the conveyance.

3. The method of claim 1, wherein the alternative source is a conveyance location service, and the alternative position fix data is conveyance position fix data for the conveyance.

4. The method of claim 1, wherein the alternative source is a second tag coupled to a second asset on the conveyance, and the alternative position fix data is position fix data generated by the second tag.

5. The method of claim 1, further comprising:
monitoring for input indicating that the asset has been removed from the conveyance; and
repeating the receiving alternative position fix data and associating the alternative position fix data until input indicating that the asset has been removed from the conveyance is received.

6. The method of claim 1, further comprising:
receiving an event notification from the tag, the event notification corresponding to a past event;
determining a position of the asset at the past time from the alternative position fix data associated with the tag; and
associating the position of the asset at the past time with the event notification as the location where the past event occurred.

7. The method of claim 6, wherein determining a position of the asset includes selecting alternative position fix data from the past time.

8. The method of claim 6, wherein determining a position of the asset includes interpolating between alternative position fix data from available times.

9. The method of claim 1, wherein the threshold is zero.

10. The method of claim 9, wherein determining that a tag coupled to the asset is unable to transmit tag position fix data describing a position of the asset includes determining that the tag is unable to transmit tag position fix data after no position fix data is received from the tag for a period of time.

11. The method of claim 9, wherein determining that a tag coupled to the asset is unable to transmit tag position fix data describing a position of the asset includes determining that the tag is unable to transmit tag position fix data from a stow plan associated with the conveyance.

12. A system, comprising:
one or more computers programmed to perform operations comprising:
receiving input indicating that a first asset has been loaded onto a conveyance;
determining that a first tag coupled to the first asset is unable to transmit tag position fix data describing a position of the first asset with a signal strength satisfying a threshold;
receiving alternative position fix data from an alternative source associated with the conveyance, the alternative position fix data describing an alternative position at a given time; and
associating the alternative position fix data with the position of the first asset at the given time.

13. A computer-implemented method, comprising:
receiving input indicating that an asset has been loaded onto a conveyance;
determining that a tag coupled to the asset is unable to transmit tag position fix data describing a position of the asset;
receiving conveyance position fix data from a device on the conveyance, the conveyance position fix data describing a position of the conveyance at a given time; and
associating the conveyance position fix data with the first tag as the position of the first asset at the given time.

14. The method of claim 13, wherein the conveyance position fix data is encoded in a satellite communications message sent from a device on the conveyance.

15. The method of claim 13, wherein the asset is a container and the conveyance is a ship.

16. A system, comprising:
one or more computers programmed to perform operations comprising:
receiving input indicating that an asset has been loaded onto a conveyance;
determining that a tag coupled to the asset is unable to transmit tag position fix data describing a position of the asset;
receiving conveyance position fix data from a device on the conveyance, the conveyance position fix data describing a position of the conveyance at a given time; and
associating the conveyance position fix data with the first tag as the position of the first asset at the given time.

17. A computer-implemented method, comprising:
receiving input indicating that a plurality of assets have been loaded onto a same conveyance;
determining that a first tag coupled to a first asset in the plurality of assets is unable to transmit tag position fix data describing a position of the asset;
identifying a second tag coupled to a second asset in the plurality of assets, the second tag able to transmit tag position fix data describing a position of the second asset;
receiving tag position fix data from the second tag, the tag position fix data indicating a position of the second asset at a given time, and then associating the tag position fix data with the position of the first asset at the given time.

18. The method of claim 17, wherein identifying the second tag comprises:
receiving position fix data from one or more of the plurality of tags; and
selecting the second tag based on a strength of signal associated with each position fix data.

19. A system comprising:
one or more computers programmed to perform operations comprising:
receiving input indicating that a plurality of assets have been loaded onto a same conveyance;
determining that a first tag coupled to a first asset in the plurality of assets is unable to transmit tag position fix data describing a position of the asset;
identifying a second tag coupled to a second asset in the plurality of assets, the second tag able to transmit tag position fix data describing a position of the second asset;
receiving tag position fix data from the second tag, the tag position fix data indicating a position of the second 
asset at a given time, and then associating the tag position fix data with the position of the first asset at the given time.

20. A system, comprising:
a relay component operable to perform operations comprising:
receiving tag position fix data from a tag coupled to an asset being transported on a conveyance;
transmitting the tag position fix data and an identifier of the tag to a server system; and
a server system operable to perform operations comprising:
receiving tag position fix data and an identifier of the tag from the relay;
associating the tag position fix data with the asset; and
determining that a tag coupled to the asset is unable to transmit tag position fix data describing a position of the asset to the server system with a signal strength satisfying a threshold.

21. The system of claim 20, wherein the relay is coupled to the conveyance.

22. The system of claim 20, wherein the relay is transported on, but not coupled to, the conveyance.

* * * * *